United States Patent
Zhao et al.

(10) Patent No.: US 11,657,494 B1
(45) Date of Patent: May 23, 2023

(54) METHOD TO DETECT DEFECTS IN BATTERY POUCH CELLS USING ANGLED FLASH THERMOGRAPHY

(71) Applicant: GM GLOBAL TECHNOLOGY OPERATIONS LLC, Detroit, MI (US)

(72) Inventors: Selina Xinyue Zhao, Rochester Hills, MI (US); Ratandeep Singh Kukreja, Auburn Hills, MI (US); Xiaosong Huang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/576,176

(22) Filed: Jan. 14, 2022

(51) Int. Cl.
| | |
|---|---|
| G06T 7/00 | (2017.01) |
| G06V 10/22 | (2022.01) |
| G06V 10/60 | (2022.01) |
| H01M 10/42 | (2006.01) |
| H01M 50/105 | (2021.01) |
| H04N 23/56 | (2023.01) |
| H01M 50/533 | (2021.01) |
| H04N 23/74 | (2023.01) |

(52) U.S. Cl.
CPC ............ *G06T 7/0004* (2013.01); *G06V 10/22* (2022.01); *G06V 10/60* (2022.01); *H01M 10/4285* (2013.01); *H01M 50/105* (2021.01); *H01M 50/533* (2021.01); *H04N 23/56* (2023.01); *H04N 23/74* (2023.01); *G06T 2207/10048* (2013.01); *G06T 2207/30108* (2013.01)

(58) Field of Classification Search
CPC .. H04N 5/2256; H04N 5/2354; G06T 7/0004; G06T 2207/30108; G06V 10/60
See application file for complete search history.

(56) References Cited

U.S. PATENT DOCUMENTS

| | | | |
|---|---|---|---|
| 2014/0109389 A1* | 4/2014 | Okamura | G01N 29/24 250/340 |
| 2014/0294036 A1* | 10/2014 | Caruthers | H01M 10/0413 374/5 |
| 2022/0123559 A1* | 4/2022 | Stefanopoulou | H01M 10/42 |
| 2022/0245784 A1* | 8/2022 | Kim | H04N 5/2354 |
| 2022/0390387 A1* | 12/2022 | Park | H01M 50/188 |

FOREIGN PATENT DOCUMENTS

CN 108732507 A * 11/2018

OTHER PUBLICATIONS

Markus Tarin, https://movitherm.com/knowledgebase/battery-inspection-using-advanced-thermography/, dated to Sep. 7, 2021 by the Wayback Machine, https://movitherm.com, Flash Thermography for Battery Inspection Section (Year: 2021).*

* cited by examiner

*Primary Examiner* — Jayanti K Patel
*Assistant Examiner* — Christopher Kingsbury Glover

(57) ABSTRACT

A flash thermography device is configured to apply a flash of light to a target area on a surface of the battery cell. An imaging device is configured to capture an image of the target area subsequent to the flash of light being applied to the surface of the battery cell. A defect detection control module is configured to receive the image captured by the imaging device, analyze the image to determine whether a defect is present in the battery cell, and selectively generate and output an indication of whether the defect is present based on the analysis of the image.

8 Claims, 5 Drawing Sheets

METHOD TO DETECT DEFECTS IN BATTERY POUCH CELLS USING ANGLED FLASH THERMOGRAPHY

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for detecting defects in battery pouch cells.

A battery or battery system (e.g., a rechargeable battery for electric and/or hybrid electric vehicles) may include a plurality of battery cells. Types of rechargeable batteries include, but are not limited to, lithium ion, lithium-sulfur (Li—S), lithium metal, and/or other types of rechargeable batteries. The battery cells may be implemented as battery pouch cells. A battery pouch cell typically includes a plurality of conductive tabs (e.g., copper foil tabs) welded to a terminal (e.g., an anode or a cathode terminal) of the battery. The tabs are encased within packaging of the battery pouch cell.

SUMMARY

A defect detection system for a battery cell includes a flash thermography device configured to apply a flash of light to a target area on a surface of the battery cell, an imaging device configured to capture an image of the target area subsequent to the flash of light being applied to the surface of the battery cell, and a defect detection control module configured to receive the image captured by the imaging device, analyze the image to determine whether a defect is present in the battery cell, and selectively generate and output an indication of whether the defect is present based on the analysis of the image.

In other features, the flash thermography device is configured to apply the flash of light at a predetermined angle relative to a line normal to the surface of the battery cell.

In other features, the imaging device is an infrared (IR) camera and the image is a thermal image.

In other features, the IR camera is configured to capture a sequence of images for a predetermined period subsequent to the flash of light.

In other features, the defect detection control module includes an image analysis module configured to analyze the thermal image.

In other features, the image analysis module is configured to perform a first analysis on the thermal image based on a thermal signature of the thermal image.

In other features, the image analysis module is configured to identify features of the thermal image indicative of the defect based on the thermal signature.

In other features, the image analysis module is configured to perform a second analysis on the thermal image in response to a determination that the identified features indicate that the battery cell includes the defect.

In other features, the image analysis module is configured to determine whether the battery cell includes the defect based on a signal to noise ratio of the thermal image.

In other features, the image analysis module is configured to determine whether the battery cell includes the defect based on whether the signal to noise ratio of the thermal image exceeds a threshold.

In other features, the image analysis module is configured to determine a type of the defect based on signal to noise ratios in respective subregions of the thermal image.

In other features, the battery cell is a battery pouch cell and the defect corresponds to a defect associated with a conductor tab of the battery pouch cell.

In other features, the target area includes a surface of packaging of the battery pouch cell adjacent to the conductor tab.

A method for detecting defects in a battery cell includes, using a flash thermography device, applying a flash of light to a target area on a surface of the battery cell, capturing an image of the target area subsequent to the flash of light being applied to the surface of the battery cell, analyzing the image to determine whether a defect is present in the battery cell, and selectively generating and outputting an indication of whether the defect is present based on the analysis of the image.

In other features, the method further includes applying the flash of light at a predetermined angle relative to a line normal to the surface of the battery cell.

In other features, the method further includes capturing the image with an infrared (IR) camera, wherein the image is a thermal image.

In other features, the method further includes performing a first analysis on the thermal image based on a thermal signature of the thermal image, wherein the first analysis includes identifying features of the thermal image indicative of the defect based on the thermal signature.

In other features, the method further includes performing a second analysis on the thermal image in response to a determination that the identified features indicate that the battery cell includes the defect.

In other features, the method further includes determining whether the battery cell includes the defect based on a signal to noise ratio of the thermal image.

In other features, the battery cell is a battery pouch cell, the defect corresponds to a defect associated with a conductor tab of the battery pouch cell, and the target area includes a surface of packaging of the battery pouch cell adjacent to the conductor tab.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Conductive tabs of a battery cell (e.g., a battery pouch cell) may be welded to a battery terminal, such as an anode terminal, and allow current to flow to and from the battery cell. The conductive tabs may include copper collector foils. Defects in the conductive tabs (e.g., discontinuities such as full or partial tears, blisters, and/or cracks in the collector foils, weld failures, air or gas bubbles, etc.) may cause battery cell failure and other faults, such as thermal runaway.

Subsequent to manufacture, the conductive tabs are encased within packaging of the battery pouch cell. For example, the packaging may comprise multiple layers of polymer, aluminum etc. Accordingly, defects in the conductive tabs are difficult to detect through the packaging. For example, technologies such as ultrasound scans, induction heating, and x-ray computed tomography (CT) scans may be unable to detect conductive tab defects that only cause small changes in scan results. CT scans are also relatively slow and are expensive to implement. Accordingly, CT scans are not desirable for inline or fast off-line quality control inspection systems.

Systems and methods according to the present disclosure are configured to detect battery cell defects using flash thermography without requiring cycling of battery cells through multiple charging and discharging cycles. For example, a flash thermography device (e.g., a lamp or other light source) is arranged to direct one or more (e.g., a sequence of) light flashes at a target region on a surface of the battery cell packaging adjacent to the conductive tabs. One or more imaging devices (e.g., infrared (IR) cameras) are arranged to capture a thermal image or signature of the target region. Defects in the conductive tabs can be detected in accordance with the captured thermal image.

Although described herein with respect to vehicle batteries (e.g., rechargeable batteries for electric or hybrid vehicles), the principles of the present disclosure may be applied to batteries used in non-vehicle applications.

Figure 1B:
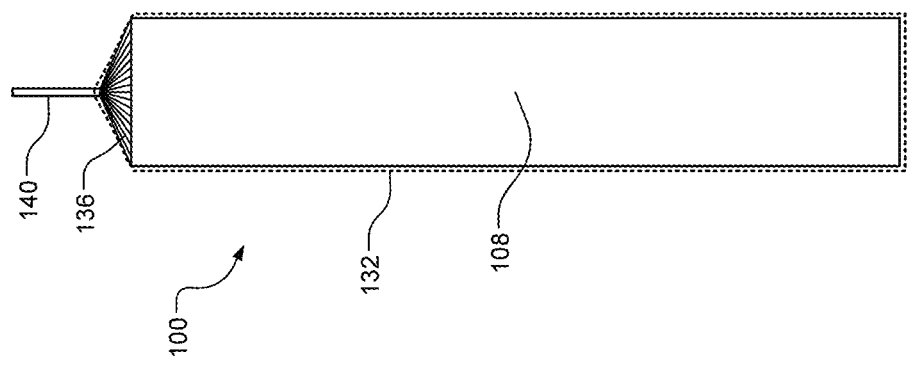
FIGS. 1A and 1B show an example battery cell.
Figure 1A:
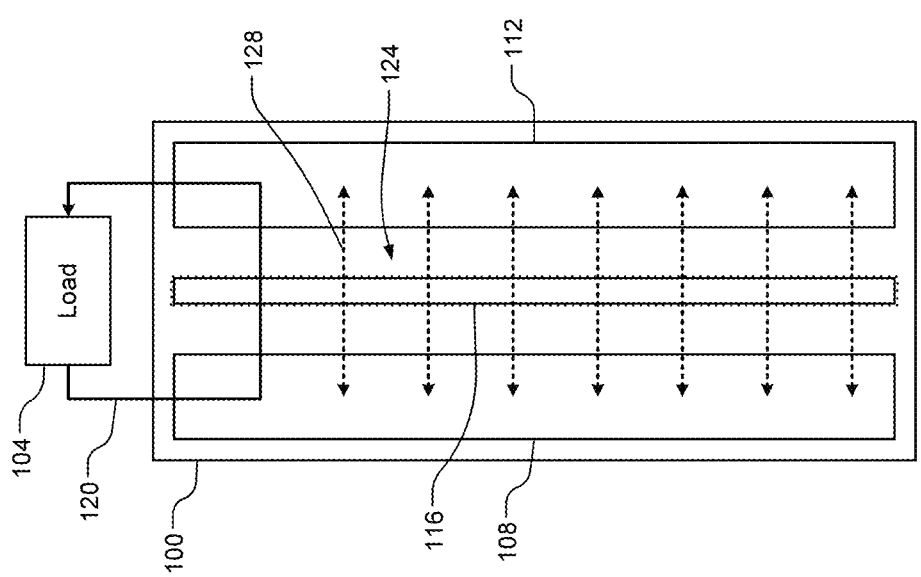

An example battery cell (e.g., a battery pouch cell) 100 for powering a load 104 is shown in FIGS. 1A and 1B. For example, the battery cell 100 corresponds to a battery of a lithium ion, Li—S, or lithium metal battery for a vehicle. As shown schematically in FIG. 1A, the battery cell 100 includes an anode 108, a cathode 112, and a separator 116 arranged between the anode 108 and the cathode 112. For example, the separator 116 is comprised of a flexible, permeable membrane.

When powering the load 104 (i.e., discharging), current flows from the anode 108 to the cathode 112 and through the load 104 in a direction indicated by arrow 120. Conversely, when charging (e.g., using a motor or other charging source), current flows from a charging source through the cathode 112 and into the anode 108 in a direction opposite the arrow 120. An electrolyte material 124 contained within the battery 100 surrounds the anode 108 and the cathode 112. The separator 116 electrically isolates the anode 108 and the cathode 112 from each other while allowing charged ions of the electrolyte material 124 to flow through the separator 116 as shown by arrows 128.

A side view of the battery cell 100 enclosed in packaging 132 is shown in FIG. 1B. A plurality of conductive tabs (e.g., copper foils) 136 extend from an end of the anode 108 and are connected (e.g., welded) to a conductive terminal 140. The conductive tabs 136 allow current to flow between the anode 108 and the terminal 140 (i.e., to allow current to flow to and from the battery cell 100. The conductive tabs 136 are enclosed within the packaging 132. Systems and methods according to the present disclosure are configured to detect defects in the conductive tabs 136 using flash thermography as described below in more detail.

Figure 2A:
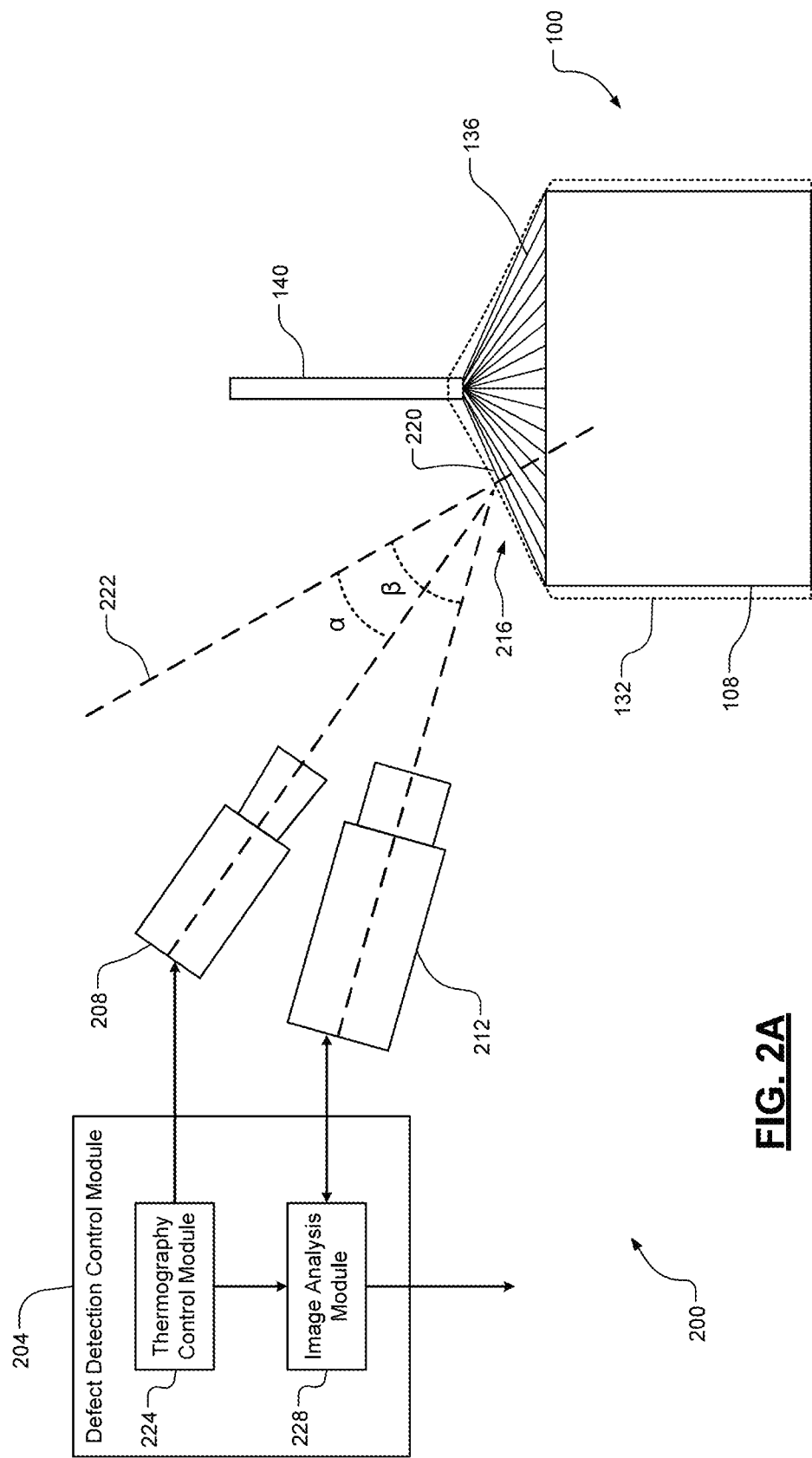
FIG. 2A is an example defect detection system according to the present disclosure.

Referring now to FIG. 2A, an example defect detection system 200 according to the present disclosure is shown. The defect detection system includes a defect detection control module 204, a light source (e.g., a lamp configured to generate a flash of light and/or a sequence of flashes, such as a flash thermography device 208), and an imaging device (e.g., an IR camera 212). The flash thermography device 208 is arranged to direct the flash of light at a target area 216 of a surface of the packaging 132. For example, the target area 216 is a rectangular area including a portion of the packaging 132 having substantial contact with an outermost (e.g., immediately adjacent) conductive tab 220 of the conductive tabs 136. In other words, the target area 216 of the packaging 132 may be in at least partial thermal contact with the conductive tab 220.

The flash thermography device 208 is configured to generate the flash of light to quickly illuminate the target area 216 for a predetermined illumination period (e.g., between 0 and 100 ms, or less than 10 ms). For example, a thermography control module 224 is configured to selectively control the flash thermography device 208 to apply the flash of light for the predetermined illumination period, at a predetermined intensity or energy level, etc. In this manner, the flash of light applies a relatively large amount of energy (e.g., up to 10 kJ) for a relatively short period to quickly heat the target area 216. Accordingly, the target area 216 is heated in a contactless and non-destructive manner. For example, the flash thermography device 208 is tuned such that the energy of the flash of light does not exceed an amount sufficient to damage the packaging 132 (e.g., a predetermined, calibrated energy).

The flash thermography device 208 is arranged to apply the flash of light at a predetermined angle α (e.g., 10-20 degrees) relative to a line 222 normal to the surface of the packaging 132 within the target area 216. The predetermined angle is configured (e.g. as determined by calibration) to uniformly apply the flash of light across an entire surface of the target area 216. The predetermined angle may vary based on a material of the packing 132, geometry of the battery cell 100, etc.

The IR camera 212 is configured to capture images (i.e., thermal images) of the target area 216 during and subsequent to the flash of light. For example, the thermography control module 224 and/or an image analysis module 228 are configured to synchronize the image capture of the IR camera 212 with the generation of the flash of light. In one example, the IR camera 212 is configured to capture images of the target area 216 upon generation of the flash of light and for a predetermined image capture period subsequent to the flash of light. For example, the IR camera 212 captures images for 30 seconds at multiple frames per second (e.g., 30 frames per second). Accordingly, for a single flash, the IR camera 212 may capture hundreds of thermal images.

Although shown with only the single IR camera 212, the system 200 may include two or more IR cameras arranged at different angles relative to the target area 216. For example only, the IR camera 212 is arranged to capture the images of the target area 216 at a predetermined angle β (e.g., 30-40 degrees) relative to the line 222.

The image analysis module 228 is configured to analyze the thermal images captured by the IR camera 212 to detect defects associated with the battery cell (e.g., defects in the conductive tabs 136, and in particular the conductive tab 220) based on the thermal images. For example, the image analysis module 228 monitors a time dependent thermal response of the surface of packaging 132 in the target area 216. Over time (i.e., as a time since the flash of light elapses), the target area 216 cools and the thermal images change accordingly. The image analysis module 228 analyzes the thermal images as they change and identifies features in the images indicative of defects in the conductive tabs 136 as described below in more detail.

For example, various defects in the conductive tab 220 (discontinuities such as full or partial tears, blisters, and/or cracks in the collector foils, weld failures, air or gas bubbles, etc.) affect a heat flow and/or distribution across the conductive tab 220, which in turn causes different features to appear in the thermal images of the surface of the target area 216 during cooling (e.g., due to heat transfer between the conductive tab 220 and the packaging 132).

Figure 2B:
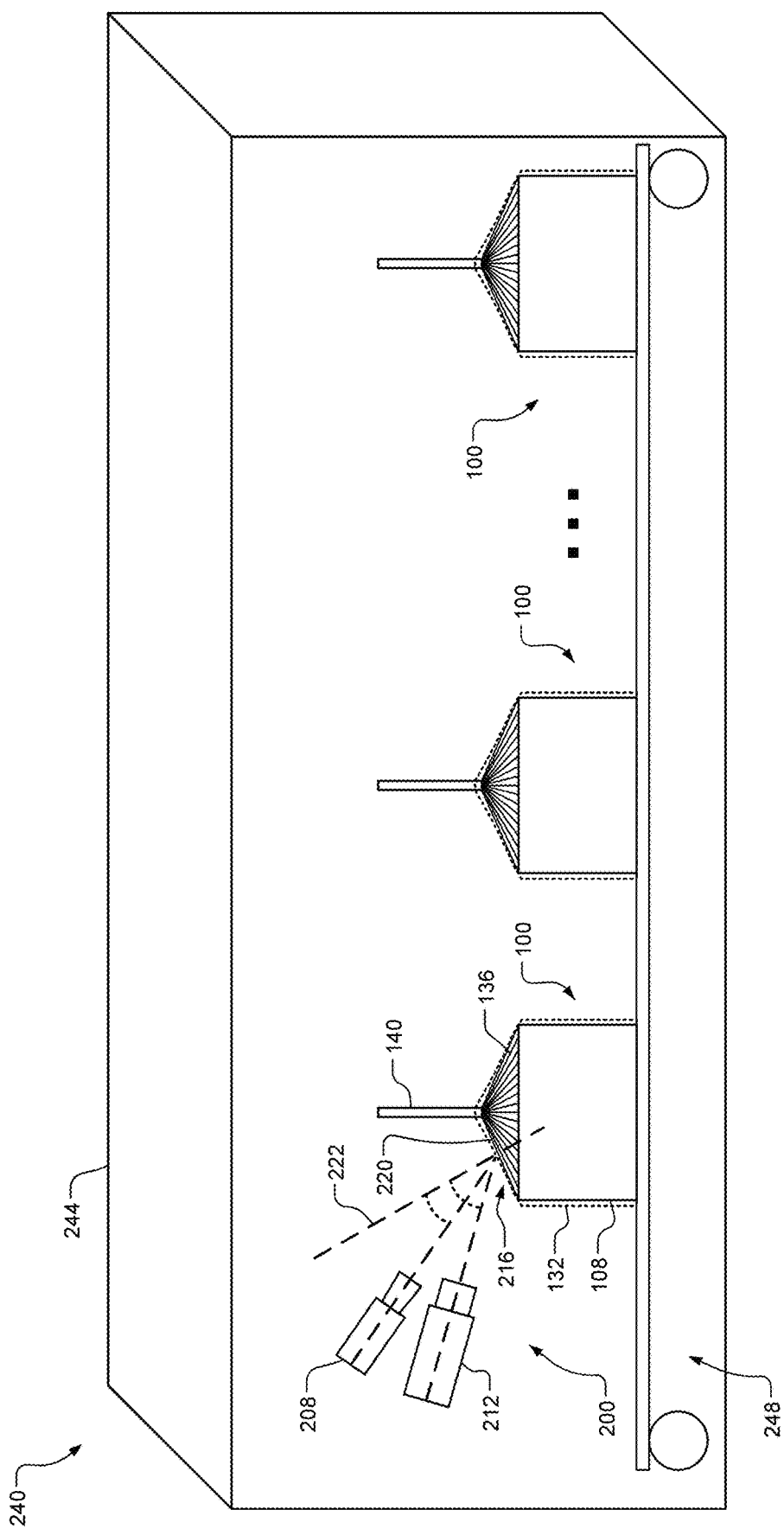
FIG. 2B is an example inspection system including the defect detection system of FIG. 2A.

In an example shown in FIG. 2B, an inspection system 240 is configured to automate defect detection and analysis of a plurality of the battery cells 100. For example, the inspection system 240 includes a sealed chamber 244 defining an interior volume. The interior volume may be temperature and/or pressure controlled (i.e., maintained at or above vacuum, with controlled airflow, etc.) to minimize environmental variables.

The battery cells 100 are arranged on a transport mechanism, such as a conveyor system 248. The conveyor system 248 is configured to sequentially align the battery cells with the flash thermography device 208 and the IR camera 212. In this manner, the defect detection system 200 is configured to scan and analyze multiple battery cells 100 to detect defects in the conductive tabs 136 as described above in FIG. 2A.

Although shown with only a single flash thermography device 208 and IR camera 212, the chamber 244 may include multiple flash thermography devices 208 and IR cameras 212 arranged in different locations. For example, the chamber 244 may include multiple defect detection systems 200 arranged at different respective stations. The respective flash thermography devices 208 and IR cameras 212 may be arranged at different angles relative to the battery cells 100, target different areas of the battery cells 100, etc. In this manner, multiple target areas 216 of the packaging 132 can be imaged and analyzed for defects.

Figure 3:
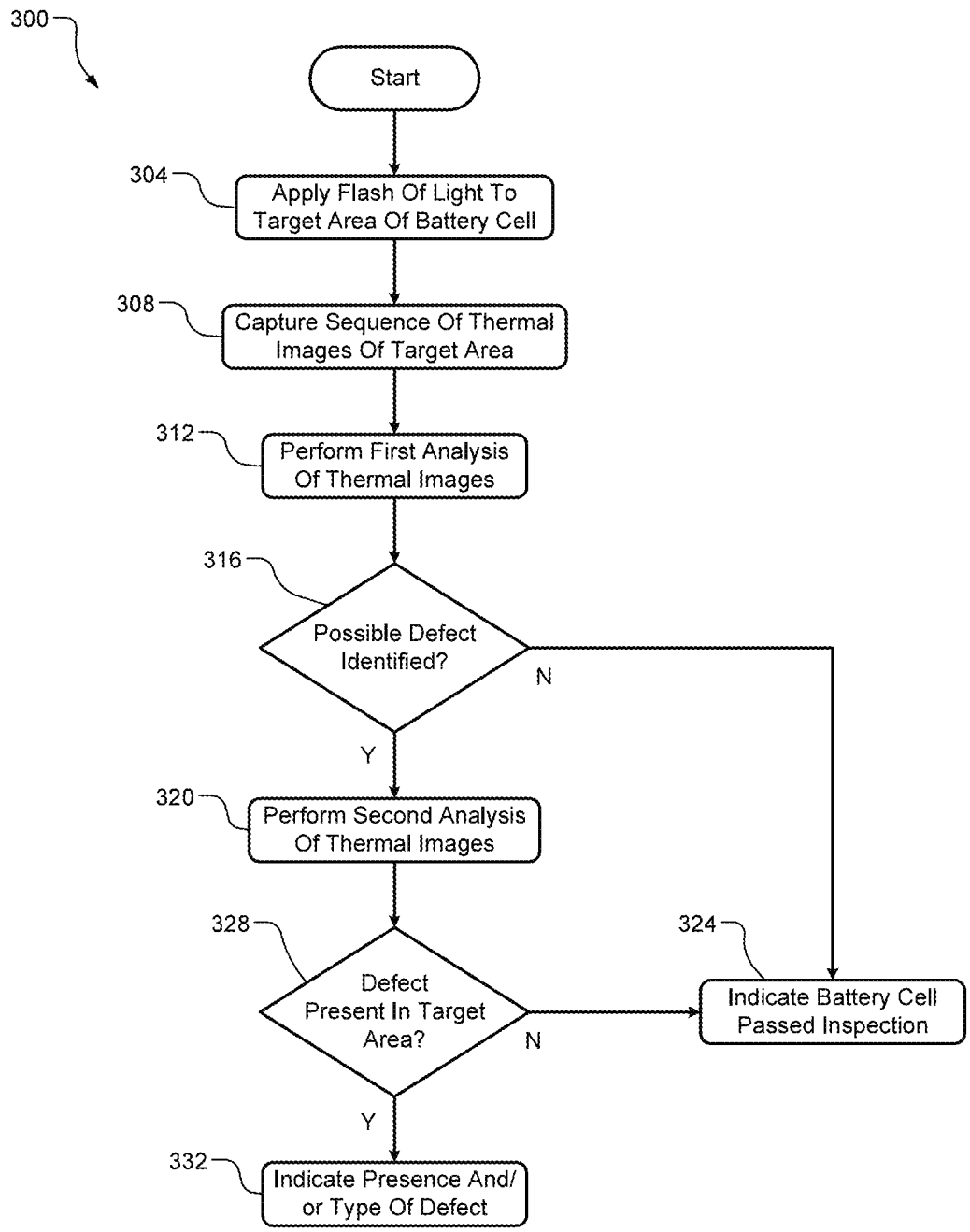
FIG. 3 illustrates steps of an example defect detection method according to the present disclosure.

Referring now to FIG. 3, an example defect detection method 300 according to the present disclosure is shown. The method 300 may be implemented in the defect detection system 200 and/or in the inspection system 240 described above.

At 304, the method 300 (e.g., the flash thermography device 208, in response to a control signal received from the defect detection control module 204) directs one or a sequence of flashes of light at a target area (e.g., the target area 216) of the battery cell 100. The flash of light is directed at a predetermined angle relative to a line normal to the surface of the target area, at a predetermined intensity, for a predetermined period, etc.

At 308, the method 300 (e.g., the IR camera 212, in response to a control signal received from the defect detection control module 204) captures a sequence of thermal images of the target area 216. For example, the IR camera 212 captures the sequence of images over a predetermined period (e.g., 30 seconds).

At 312, the method 300 (e.g., the image analysis module 228) performs a first analysis of the thermal images. For example, in the first analysis, the image analysis module 228 determines thermal signatures of the images. The thermal signatures indicate heat distribution and flow across the surface in the target region 216. In some examples, the image analysis module 228 applies a thermal signature algorithm to the sequence of images (e.g., a normalization or histogram normalization algorithm) that identifies thermal signature features in the images. For example, thermal signature features may correspond to areas of the images that have increased or decreased temperatures (e.g., as indicated by pixel intensity) relative to other areas of the images, areas that demonstrate increased or decreased rates of change of temperature relative to other areas, etc.

At 316, the method 300 (e.g., the image analysis module 228) determines whether any thermal signature features indicative of a defect were identified in the images. For example, the image analysis module 228 determines whether any thermal signature exceeds a corresponding threshold (e.g., determines whether a pixel intensity in a particular area exceeds an average pixel intensity for the image, exceeds a standard deviation of pixel intensity, etc.). If true, the method 300 continues to 320. If false, the method 300 indicates that the battery cell being analyzed has passed inspection. For example, the method 300 may activate a visual indicator (e.g., an LED), send an alert to a display, etc. indicating that no defects were detected at 324.

At 320, the method 300 (e.g., the image analysis module 228) performs a second analysis of the images to determine whether any of the identified thermal signature features corresponds to a defect. For example, the image analysis module 228 is configured to perform a thermal signal reconstruction of the images to further characterize the identified thermal signature features. As one example, the image analysis module 228 determines a signal to noise ratio (SNR) in various subregions or bands of the target area. Generally, a low SNR (e.g., an SNR of approximately (within 10% of) 1.0) may indicate that no defect is present. More specifically, a low SNR in a subregion indicates that pixel intensity (and, therefore, the thermal signature) is relatively low. Conversely, a high SNR (e.g., an SNR of greater than 1.10) in any subregion of the target area 216 indicates that at least one defect is present.

At 328, the method 300 (e.g., the image analysis module 228) determines whether any defect is present in the target area 216 based on the second analysis. If true, the method 300 continues to 332. If false, the method 320 continues to 324.

Figure 4:
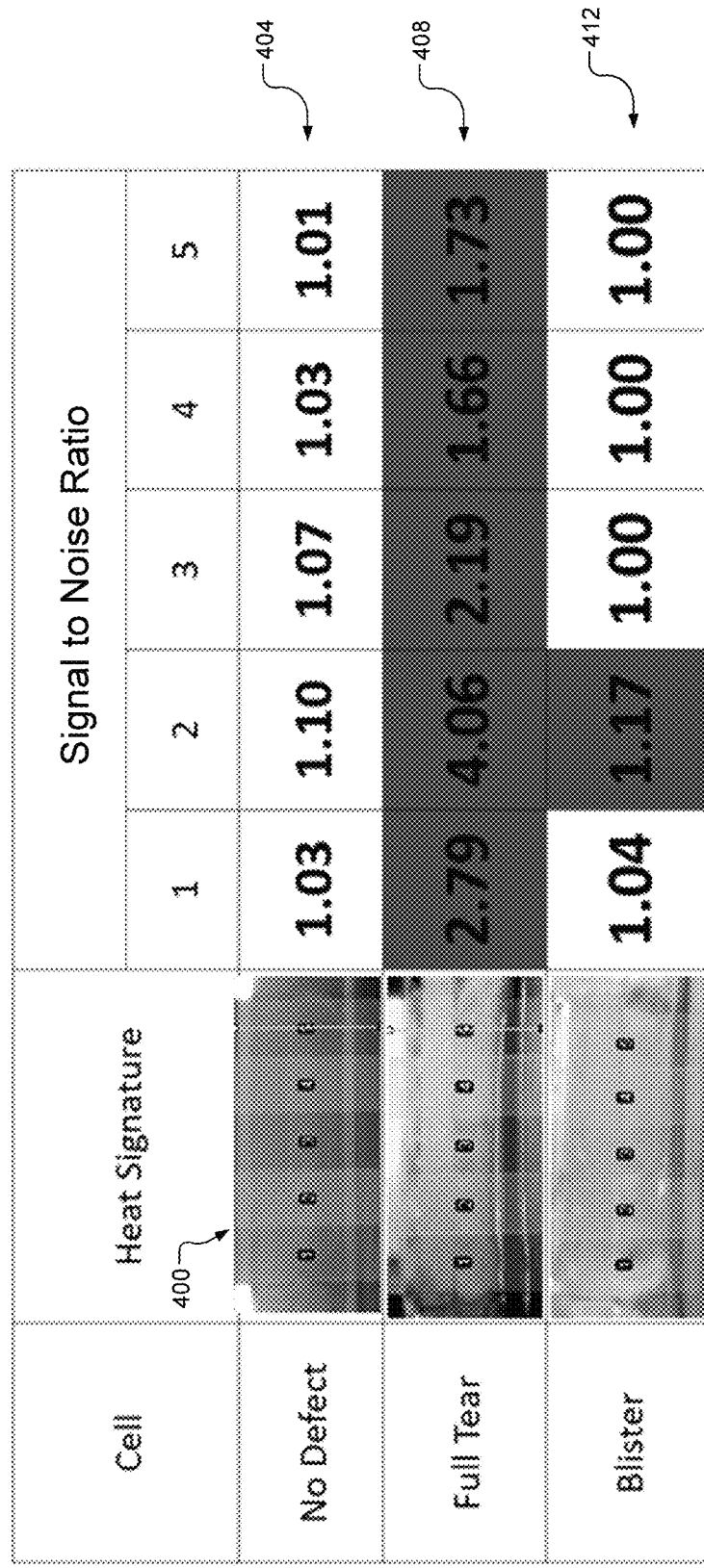
FIG. 4 illustrates signal to noise ratios for different defect types identified by the defection detection systems and methods according to present disclosure.

At 332, the method 300 indicates that a defect was identified in the battery cell 100. For example, the method 300 may active a visual indicator, send an alert to a display, etc. indicating that a defect was identified. In some examples, the method 300 may further identify a type of the defect. For example, as shown in FIG. 4, images 400 of a target area include different subregions (e.g., subregions 1-5). In a first example shown at 404, the SNRs across all subregions are 1.10 or less and therefore no defect is identified.

Conversely, in a second example shown at 408, the SNR in each of the subregions is significantly greater than 1.10 (e.g., from 1.66 to 4.06). Accordingly, a defect is identified in each of the subregions. In this example, the presence of defects across the entire target area 216 may be indicative of a full tear of the conductive tab 136. Defects across multiple adjacent subregions may be indicative of at least a partial tear.

In a third example shown at 412, the SNR of only one of the subregions is greater than 1.10 (i.e., the SNR of 1.17 in subregion 2). In this example, the presence of a defect in only one of the subregions may indicate a defect such as an air bubble or blister.

In this manner, at 332, the method 300 may further indicate a type of the defect detected.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A defect detection system for a battery cell, the defect detection system comprising:
 a flash thermography device configured to apply a flash of light to a target area on a surface of the battery cell;
 an imaging device configured to capture an image of the target area subsequent to the flash of light being applied to the surface of the battery cell; and
 a defect detection control module configured to
  receive the image captured by the imaging device,
  analyze the image to determine whether a defect is present in the battery cell, and
  selectively generate and output an indication of whether the defect is present based on the analysis of the image,
 wherein:
  the imaging device is an infrared (IR) camera and the image is a thermal image;
  the defect detection control module includes an image analysis module configured to analyze the thermal image;
  the image analysis module is configured to perform a first analysis on the thermal image based on a thermal signature of the thermal image;
  the image analysis module is configured to identify features of the thermal image indicative of the defect based on the thermal signature;
  the image analysis module is configured to perform a second analysis on the thermal image in response to a determination that the identified features indicate that the battery cell includes the defect;
  the image analysis module is configured to determine whether the battery cell includes the defect based on whether a signal to noise ratio of the thermal image exceeds a threshold; and
  the image analysis module is configured to determine a type of the defect based on signal to noise ratios in respective subregions of the thermal image.

2. The defect detection system of claim 1, wherein the flash thermography device is configured to apply the flash of light at a predetermined angle relative to a line normal to the surface of the battery cell.

3. The defect detection system of claim 1, wherein the IR camera is configured to capture a sequence of images for a predetermined period subsequent to the flash of light.

4. The defect detection system of claim 1, wherein the battery cell is a battery pouch cell and the defect corresponds to a defect associated with a conductor tab of the battery pouch cell.

5. The defect detection system of claim 4, wherein the target area includes a surface of packaging of the battery pouch cell adjacent to the conductor tab.

6. A method for detecting defects in a battery cell, the method comprising:
 using a flash thermography device, applying a flash of light to a target area on a surface of the battery cell;
 capturing an image of the target area subsequent to the flash of light being applied to the surface of the battery cell;
 analyzing the image to determine whether a defect is present in the battery cell; and
 selectively generating and outputting an indication of whether the defect is present based on the analysis of the image,
 wherein:
  the flash thermography device is an infrared (IR) camera and the image is a thermal image; and
  the method further comprises:
   analyzing the thermal image;
   performing a first analysis on the thermal image based on a thermal signature of the thermal image;
   identifying features of the thermal image indicative of the defect based on the thermal signature;
   performing a second analysis on the thermal image in response to a determination that the identified features indicate that the battery cell includes the defect;
   determining whether the battery cell includes the defect based on whether a signal to noise ratio of the thermal image exceeds a threshold; and
   determining a type of the defect based on signal to noise ratios in respective subregions of the thermal image.

7. The method of claim 6, further comprising applying the flash of light at a predetermined angle relative to a line normal to the surface of the battery cell.

8. The method of claim 6, wherein the battery cell is a battery pouch cell, the defect corresponds to a defect associated with a conductor tab of the battery pouch cell, and the target area includes a surface of packaging of the battery pouch cell adjacent to the conductor tab.

* * * * *